United States Patent [19]

Dapiran et al.

[11] Patent Number: 4,626,150
[45] Date of Patent: Dec. 2, 1986

[54] MACHINE TOOL FOR MACHINING WORKPIECES BY CHIP REMOVAL ACCORDING TO A QUADRIC SURFACE OF REVOLUTION, PARTICULARLY FOR SUPER FINISHING OF CYLINDRICAL SURFACES

[75] Inventors: Alirio Dapiran, Montalto d'Ivrea; Gurioli Giovanni, Ivrea, both of Italy

[73] Assignee: Istituto per le Richerche di Tecnologia Meccanica Rtm, Vico Canavese, Italy

[21] Appl. No.: 683,632

[22] Filed: Dec. 19, 1984

Related U.S. Application Data

[63] Continuation-in-part of Ser. No. 393,400, Jun. 29, 1982, abandoned.

[51] Int. Cl.⁴ .............................................. B23C 3/04
[52] U.S. Cl. ...................................... 409/199; 407/36; 407/39
[58] Field of Search ...................... 409/199, 131, 132; 407/21, 36, 38, 39

[56] References Cited

U.S. PATENT DOCUMENTS

| | | | |
|---|---|---|---|
| 1,126,107 | 1/1915 | Simmons | 407/21 |
| 1,689,566 | 10/1928 | Trbojevich | 407/21 |
| 2,215,007 | 9/1940 | Kraus | 409/132 |
| 2,216,539 | 10/1940 | Massee | 409/132 X |
| 2,426,382 | 8/1947 | Wilson | 407/39 |

OTHER PUBLICATIONS

Polishmaster–Max Daetwyler Co., West Babylon, N.Y.

Primary Examiner—Z. R. Bilinsky
Attorney, Agent, or Firm—Fidelman, Wolffe & Waldron

[57] ABSTRACT

A machine tool essentially comprises a chuck or workpiece holding assembly (S) for rotating a workpiece (W) about a revolution axis (X) of a surface to be obtained on the workpiece, and a rotary composite tool (22) having a series of elementary tools ($32_1 \ldots 32_6$) located at angularly spaced apart positions about an axis of rotation for the composite tool; each elementary tool has respective front cutting edges (40) substantially radial relative to such an axis of rotation. The axis of rotation for the composite tool is orthogonal to a plane tangent to the surface to be obtained on the workpiece and the composite tool is movable relative to the workpiece parallel to such a plane. The consecutive front cutting edges are arranged on the composite tool at decreasing spacings from its axis of rotation, and at decreasing spacings from the workpiece surface. The farthest front cutting edge from the axis of rotation is also the farthest cutting edge from the tangent plane.

12 Claims, 11 Drawing Figures

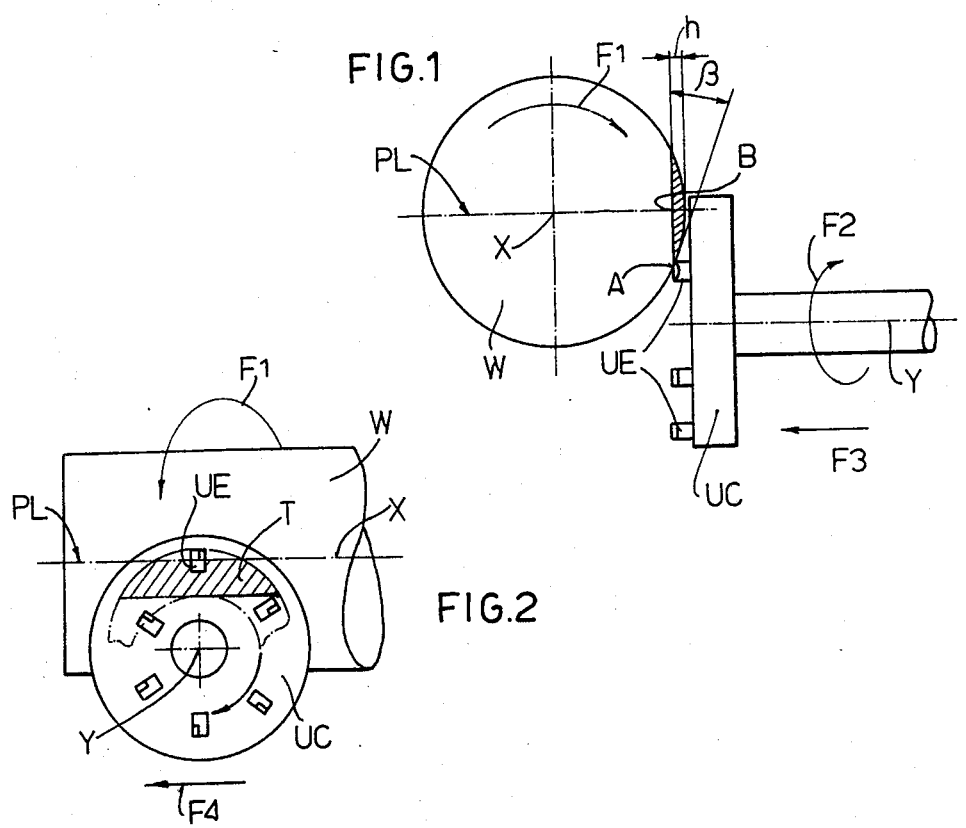
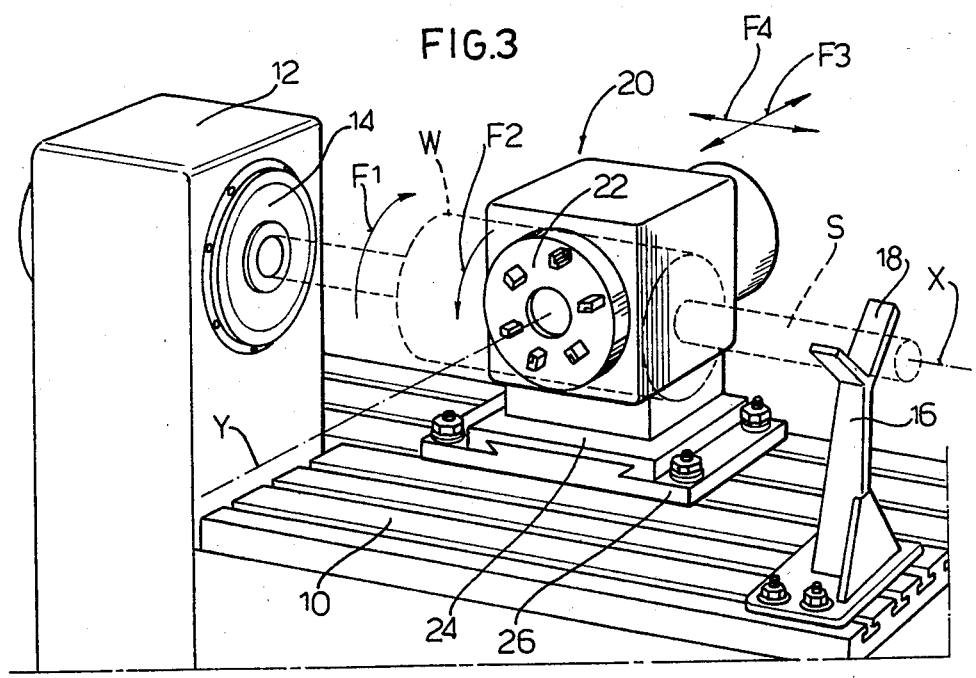

MACHINE TOOL FOR MACHINING WORKPIECES BY CHIP REMOVAL ACCORDING TO A QUADRIC SURFACE OF REVOLUTION, PARTICULARLY FOR SUPER FINISHING OF CYLINDRICAL SURFACES

This application is a continuation-in-part of Ser. No. 393,400 filed on June 29, 1982, now abandoned.

This invention relates to a machine tool for chip-forming machining (i.e. machining by chip removal) on workpieces according to a quadric surface of revolution, said machine tool being of a type substantially comprising a chuck or workpiece holding unit apt to rotate a workpiece about the axis of the quadric surface to be obtained, and a rotary composite tool having a series of elementary tools located at angularly spaced apart positions about the axis of rotation for the composite tool, said elementary tools having respective side cutting edges substantially parallel with one another and forwardly of the direction of rotation, as well as respective front cutting edges substantially radial relative to such an axis of rotation, and wherein the axis of rotation for the composite tool is orthogonal to a plane tangent to said quadric surface and the composite tool is movable relative to the workpiece parallel with such a plane.

The known elementary tools have both cutting edges inclined with respect to a plane which is tangent to the surface to be obtained, so that each elementary tool creates a groove on the workpiece surface.

A machine corresponding to this definition has been already known, which has been developed for the working or machining of cylindrical surfaces and particularly for the finishing of cylinders or rollers in offset printing. This machine is manufactured by Max Dätwyler & Co., Bleienbach, Switzerland, and is commercially available under the trademark "Polishmaster"; the said machine is schematically shown in FIGS. 1 and 2.

In this machine the composite tool UC comprises a toolholder disc. Two series of seatings adjacent the disc periphery are formed in a front surface of the disc facing the workpiece. Respective roughshaping elementary tools $UE_s$ are mounted in the seatings of one series, while respective finishing elementary tools $UE_f$ are mounted in the seatings of the other series. These elementary tools are of a monocrystal diamond type or a sintered carbon powder type.

A cylindrical workpiece is referenced W. The workpiece axis of rotation is referenced X, the axis of rotation of the composite tool is referenced Y.

The elementary tools are mounted in the seatings thereof to be shifted parallely to the axis of rotation for the composite tool between a relative advanced working or machining position and a relative retracted rest or inoperative position. In order to carry out the rough-shaping of the workpiece surface, the rough-shaping tools are brought to advanced position and the finishing tools to retracted position (as shown in FIG. 1) and vice versa for finishing.

The operation of the prior art machine will now be described.

To carry out a rough-shaping pass, the piece W is slowly rotated about the axis X and the composite tool UC is rapidly rotated about the axis Y. The directions of rotation for said piece W and tool UC are indicated by the respective arrows $F_1$ and $F_2$.

The composite tool UC is initially retracted relative to piece W and is at the beginning of said piece. In order to start a rough-shaping operation, the tool UC is moved near the piece W according to the arrow $F_3$ until an interference equal to the stock material to be removed in one pass is defined between said elementary tools UE and workpiece W. Then, the tool UC is moved parallel with the axis X according to arrow $F_4$. The arrangement is such that each elementary tool $UE_s$ and $UE_f$ moves with said movements through a cycloidal path. This path is substantially tangent to the circumference of piece W.

The location of first contact of an elementary tool with piece W is indicated at A.

In this cycloidal path each elementary tool removes a cycloid arc shaped chip.

Indicating by $\beta$ the angle in degrees travelled by the rotating workpiece between an elementary tool UE and the next tool, by n the r.p.m. of the piece, by N the r.p.m. of the composite tool and by Z the number of tools, it will be:

$$\beta = (n/N) \cdot (360^\circ / Z)$$

In order to obtain an effectively cylindrical machined surface, the above mentioned angle $\beta$ should be negligible. This is why N must be by far higher than n.

A composite tool such as that of the prior art machine allows to effect only one rough-shaping pass or one finishing pass in the path or travel of tool UC along said piece W.

For example, to effect a second rough-shaping pass, said tool UC has to be more approached to said piece W according to arrow $F_3$, or the elementary tools $UE_s$ have to be advanced.

To pass from rough-shaping to finishing, the rough-shaping elementary tools have to be retracted and the finishing elementary tools have to be advanced and then the successive finishing passes are carried out.

When having to effect an accurate machining, such as that required for the finishing of a copper cylinder or roller for offset printing, the prior art machine should meet requirements of very high accuracy as to positioning of the elementary tools, particularly the finishing tools. Owing to possible shifting of these tools, it will be readily understood that the accurate positioning thereof involves an extremely costly construction.

Furthermore, the prior art machine suffers from the disadvantage of having comparatively long machining times, in that the machine would involve at least two distinct passes, that is a first rough-shaping pass and a second finishing pass.

A machine according to the prior art would also be suitable for the machining of rotational surfaces other than cylindrical surfaces. For example, should the translation motion of the composite tool along the piece be convergent with respect to the axis of rotation for the piece, a conical surface could be obtained. If this direction were skew with respect to the axis of rotation for the piece, a rotational surface could be obtained such as that of a hyperboloid of one sheet, such as for example the surface of a hyperbolic mirror.

A composite tool is also known (U.S. Pat. No. 2,426,382) which comprises a series of rough-shaping tools and a series of finishing tools; each finishing tool is on a same radius and operates at a same time as a rough-shaping tool; this would not allow the composite tool to be used for machining work-pieces requiring a high finishing degree, due to the vibrations transmitted between each rough-shaping tool and the finishing tool on the same radius.

The basic problem of the present invention is to provide a machine of the type outlined at the beginning, intended to the finishing of copper cylinders or rollers for offset printing, but also for generating any ruled quadric surface of revolution, in which machine the requirements of accuracy in positioning the elementary tools can be more inexpensively met, said machine also allowing to provide the entire machining in a single pass along the piece, from the first rough-shaping to the last mirror finishing.

According to the present invention, this problem is solved by means of a machine tool of the first mentioned type, characterized in that the consecutive front cuttings edges are arranged on the composite tool at decreasing spacings from its axis of rotation and at decreasing spacings from a plane tangent to the surface to be obtained, the farthest front cutting edge from the axis of rotation being also the farthest cutting edge from the piece.

According to another feature, each cutting edge is located radially with respect to the axis of the composite tool and in a plane at right angles to the axis of the composite tool.

According to another feature, in the machining process the composite tool is positioned so that a finishing tool, in its path about the tool axis of rotation, with its cutting edge describes a flat annulus, the longest chord of which is coincident with a generatrix of the surface to be obtained.

According to another feature, no other tool is placed on a same radius as a finishing tool.

According to a further feature, the elementary tools lay-out such that no other tool is biting or operating on the workpiece when the finishing tool is biting on it; in other words the chordal distance between a finishing tool and each tool adjacent thereto is larger than the length of a chord subtended by the arc of the annulus which is being machined on the workpiece, in a plane which is tangent to the workpiece surface to be obtained and at right angles to the rotational axis of the composite tool.

According to further features, a part of each circular path for each following or next cutting edge, with respect to the direction of rotation, overlaps the path of the immediately preceding cutting edge.

Owing to this solution, in a revolution of the composite tool each of the elementary tools carries out a pass on the piece removing a chip of its own. The farthest tool from its rotational axis, which is also the least projecting tool, effects a first rough-shaping pass. The next tool, located on a minor radius than the preceding tool and which projects to a larger degree relative thereto, effects a second rough-shaping pass and so on, to the last elementary tool, which is closest to the axis of rotation and projects to a larger degree. This last elementary tool effects the last finishing pass.

Since the elementary tools are fixed relative to the body of the composite tool, the problems of accuracy in positioning would essentially exist only upon assembling of the individual elementary tools on the composite tool, as such elementary tools then shall not to and fro move. On the contrary, an accurate positioning would exist only for the finishing elementary tools, which generally are the last two tools in a series of tools. The rough-shaping elementary tools, which are ahead of the finishing elementary tools, may be positioned with larger tolerances, as the errors thereof will be ultimately corrected by the last finishing tool.

In addition to the smaller difficulties of accurate positioning, a machine according to the invention has the advantage of allowing a machining of a cylindrical surface or other quadric surface of revolution in a single pass, during which the whole machining stock is gradually removed by the successive tools to the finishing size; further an optimum finish may be achieved, better than the finish achieved with prior art machine tools.

The invention will become more apparent from the reading of the following detailed description, with reference to the accompanying drawings, in which:

FIGS. 1 and 2, previously described, schematically show in two orthogonal views the essential elements of a machine according to the prior art;

FIG. 3 is a fragmentary perspective view showing a machine tool according to the invention;

Figure 4:
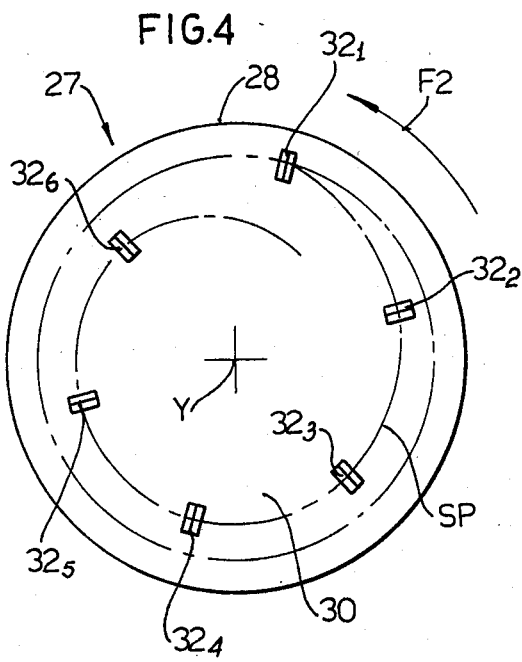
FIG. 4 is a front view showing the machine composite tool with the relative elementary tools; a workpiece is drawn in dash-dot lines; an arc of an annulus described by the finishing tool is also drawn.

Referring to FIG. 3, a machine tool comprises a bed 10. At one end of this bed 10 there is a driving head 12. The head 12 comprises a rotary spindle 14 with a conical seating, in which one end of a chuck or faceplate shaft S (shown in the drawing with a dashed outline) can be coupled.

A support 16 is mounted on said bed 10 and has a V-shaped upper cradle 18 for supporting the other end of shaft S.

Said shaft S has keyed thereto a piece W to be machined (shown in the drawing with a dashed outline), such as a copper cylinder or roller for offset printing, to be subjected to fine finishing or superfinishing.

The rotational axis for shaft S and cylinder or roller W is indicated by X and the direction of rotation thereof is indicated by arrow $F_1$. In the machine shown, the axis X is horizontal.

However, in case of superfinishing for thin cylinders or rollers, the axis of rotation for the piece could be vertical, in order to obviate to deflection by gravity.

At one side of bed 10 there is an operating head 20 carrying a composite tool 22, rotatable about an axis Y in the direction indicated by arrow $F_2$. This axis Y is horizontal and orthogonal to a vertical plane containing the axis X.

The operating head 20 is carried by a slide 24, in turn carried by a carriage 26. The slide 24 is movable on the carriage 26 transversely to the axis X of piece W and in oposite direction, that is parallel with the axis Y, as indicated by arrow $F_3$. The carriage 26 is movable parallel with the axis of rotation X for the piece W through a feed mechanism, such as a lead screw one (not shown), in which the screw is driven, for example, according to a predetermined ratio, by the driving head 12.

The traverse direction for the operating or driving head 20 in its operative strokes is indicated by double arrow $F_4$.

Figure 5:
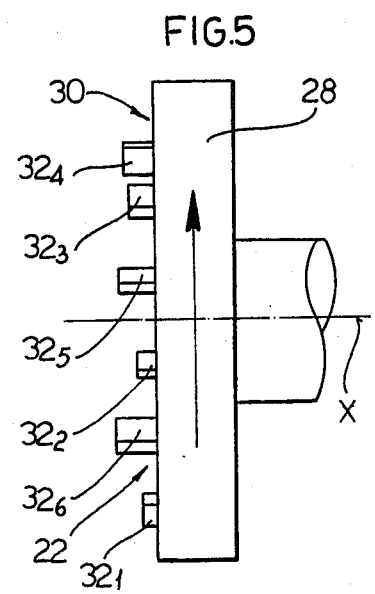
FIG. 5 is a side view of said composite tool; the workpiece is partially shown.

Referring to FIGS. 4 and 5, the composite tool 22 includes a supporting body 28 in the form of a disc with a radial front face 30.

A plurality of elementary tools (six in the case shown) project from the front surface 30, these tools being designated by $32_1, \ldots 32_6$. These elementary tools are located at angularly equidistant positions relative to the axis of rotation Y for disc 28.

Each elementary tool comprises a small steel bar 34 (FIG. 6) connected and firmly secured within a seating (not shown) in said disc 28 and opening on its front face 30. At one end projecting from face 30, said small bar 34 carries an insert or plate 36, for example of sinthetic diamond. Said insert 36 has a front cutting edge 40. This fron cutting edge 40 is radial relative to axis Y and parallel with a plane tangent to the cylindrical surface to be obtained on the piece. In the most general case of a rotational ruled quadric surface, the cutting edge 40 would be parallel with the plane tangent to the quadric surface to be obtained, which tangent plane is swept by the front cutting edge of the finishing tool.

Though the front cutting edge of each elementary tool has been described as "radial" with respect to axis Y, it is understood that a composite tool could bear elementary tools having their front cutting edges in an arrangement other than radial, with respect to axis Y; a radial arrangement of cutting edges however is at present preferred.

Figure 6:
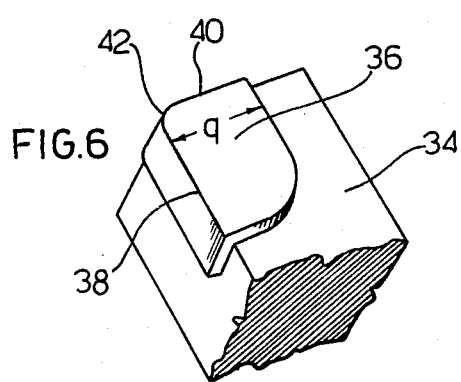
FIG. 6 is a fragmentary perspective view showing one of the elementary tools.
Figure 6A:
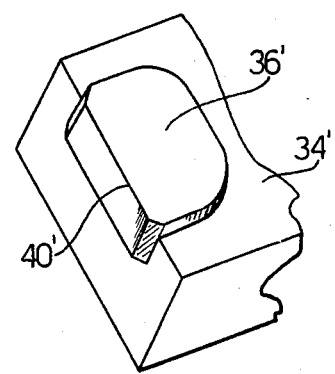
FIG. 6a is a fragmentary perspective view of a modified elementary tool.

In FIG. 6a a modified elementary tool comprises a steel bar 34'; a cutting insert 36' thereof has a front cutting edge 40', and a cutting edge 38 which is ahead with respect to the tool direction of rotation and parallel to y-axis.

The two cutting edges 38 and 40' are conventionally radiused through a cutting edge section 42, in form of a quarter of circle, or they have a 45° chamfer.

The front cutting edges have preferably same radial lengths q.

The six elementary tools $32_1, \ldots 32_6$ are arranged so that the consecutive front cutting edges 40 are at decreasing spacings from the axis of rotation Y. Preferably, the front cutting edges 40 are arranged according to an Archimedean spiral SP centered on the axis Y. The spirals could be more than one. The radial lengths q of the front cutting edges 40 are such that a portion of the circular path of each successive cutting edge 40, with reference to the direction of rotation $F_2$, overlies the path of the immediately preceding cutting edge. This will be further explained with reference to FIG. 10.

Figure 7:
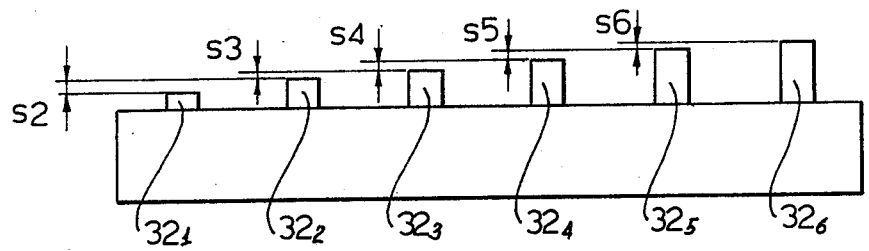
FIG. 7 is schematic developed view of the composite tool with its elementary tools.

The front cutting edges 40 of the elementary tools project from the front face 30 of disc 28 (FIG. 7) of different lengths. The said projecting lengths increase from the first radially outermost tool or front cutting edge $32_1$ to that of the last radially innermost tool $32_6$.

The projecting length differences from one tool to the next are indicated by $s_2, \ldots s_6$. As it will be seen hereinafter, these differences, which are not necessarily equal to one another, correspond on the chip or machining stock removed by each successive elementary tool following the first tool $32_1$.

In other terms, the consecutive front cutting edges 40 of the elementary tools from the first tool $32_1$ to the last tool $32_6$ are at decreasing spacings from said tangent plane and the farthest front cutting edge from the axis of rotation Y for the composite tool is also the farthest from the tangent plane.

The distribution of the six elementary tools is in accordance with said spiral within an annulus centered on the axis of rotation Y for the composite tool and intersected by a longitudinal plane having the axis of rotation X for the piece lying therein. This longitudinal plane corresponds to the horizontal plane, which is indicated by line PL in FIG. 5.

Owing to this arrangement and taking into account the directions of rotation for the piece and composite tool, as well as the translation movement of the latter, it is provided that an elementary tool will meet the piece at its descending portion below the longitudinal plane PL and about the location A of FIGS. 4 and 5. In other words, an elementary tool engages the piece in a zone where minimum is the material removal, so that the effects of start engagement impact of the elementary tool and the piece are negligible.

Moreover, even if at machining start should the first tool engaging the piece not be the first tool $32_1$ of the series, but one of the last tools $32_5$ or $32_6$ of the series, which are finishing tools, such as elementary tool would not be damaged because the stock thickness to be removed would be less than the stock to be removed by the preceding tool. Immediately afterwards, the engagement would occur for one of the first tools of the series, that is a rough-shaping tool, which due to its outermost position in the spiral would operate in the zone of larger chip removal. Then, this tool would be followed by the whole series of successive elementary tools, to a steady machining condition.

Preferably, the longitudinal plane PL passes through the path of the front cutting edge 40 of the last tool $32_6$, which is closest to the axis of rotation for the composite tool and said tangent plane. Path AB, drawn on the annulus swept by cutting edge 40, completely lies on plane PL.

Thus, the last elementary tool $32_6$, which is a finishing tool, is operative under the best conditions, i.e in arc AB in FIG. 4.

Figure 8:
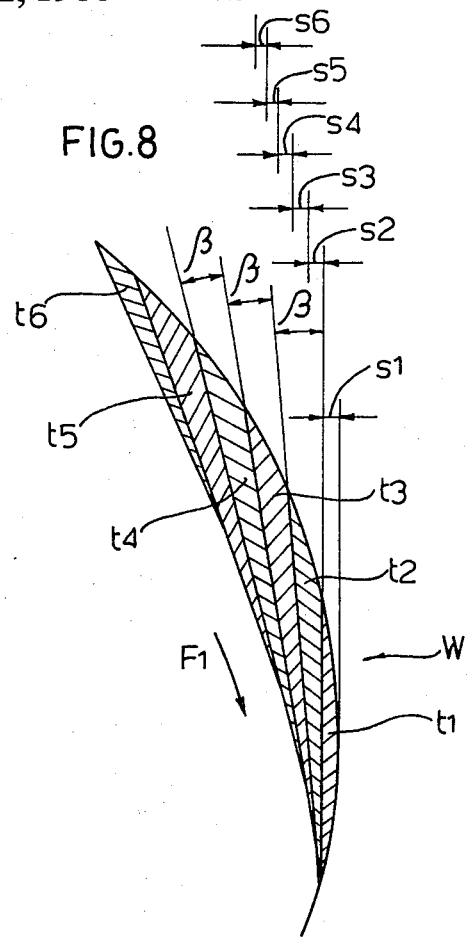
FIG. 8 is a schematic fragmentary cross-sectional view through a workpiece being machined, wherein the scales of chip removals carried out by the individual tools and the scales for the angles of rotation of the piece have been highly exaggerated.
Figure 10:
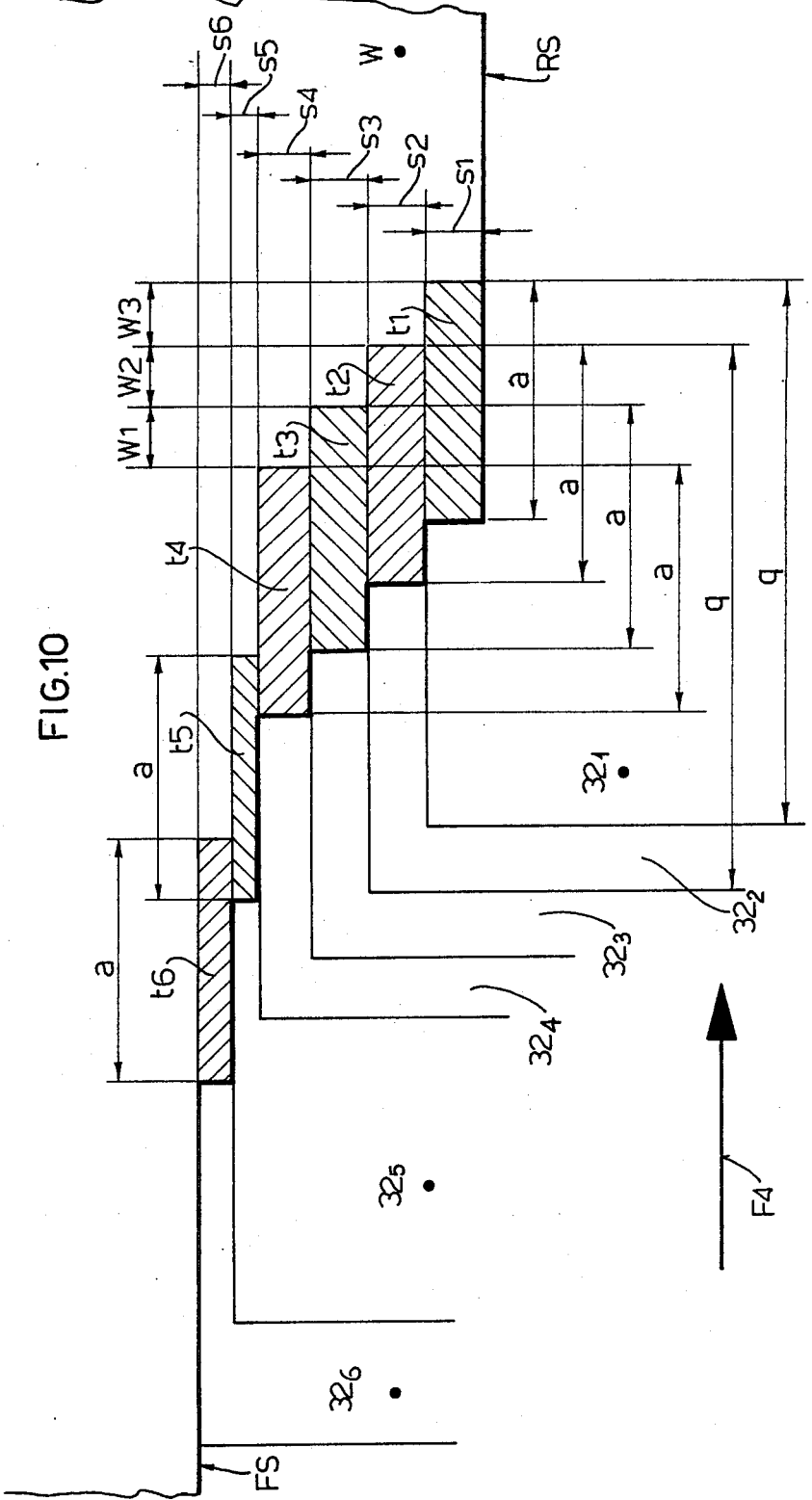
FIG. 10 is a scheme equivalent to a longitudinal section of the piece, wherein the thickness of stocks successively removed by the successive elementary tools have been again shown on highly exaggerated scale.

On highly exaggerated scale, FIGS. 8 and 10 show how the successive elementary tools work or operate.

In FIG. 8, the hatched "segments" $t_1, t_2, \ldots t_6$ indicate the removed zones in form of chips by the successive elementary tools on the workpiece W which is rotating as indicated by arrow $F_1$. The angles $\beta$ indicate the angular path for the surface of piece W under the action of each individual tool. The dimensions $s_1, s_2, \ldots s_6$ indicate the maximum chip thickness removed by each individual tool. Particularly, $s_1$ is the chip thickness removed by the first elementary tool $32_1$, while the successive thicknesses $s_2, s_3, \ldots s_6$ correspond to the projection differentials $s_6$ of FIG. 7.

As it will be seen, the elementary tools remove material from the periphery of the piece according to a polygonal.

The above cited formula is still true, that is:

$$\beta = (n/N) \cdot (360°/Z)$$

By selecting n (cylinder or roller r.p.m.) in the range of 1 to 18, N (r.p.m.) of the composite tool equal to 4500 and Z (number of elementary tools) equal to 6, it will be found that said angle $\beta$ is in the order of 1/100 to 2/100 degrees, that is quite negligible, whereby the polygonal is actually a circle and the finished piece is cylindrical with discontinuity less than 1 $\mu$m (for a workpiece diameter about 150 mm).

Figure 9:
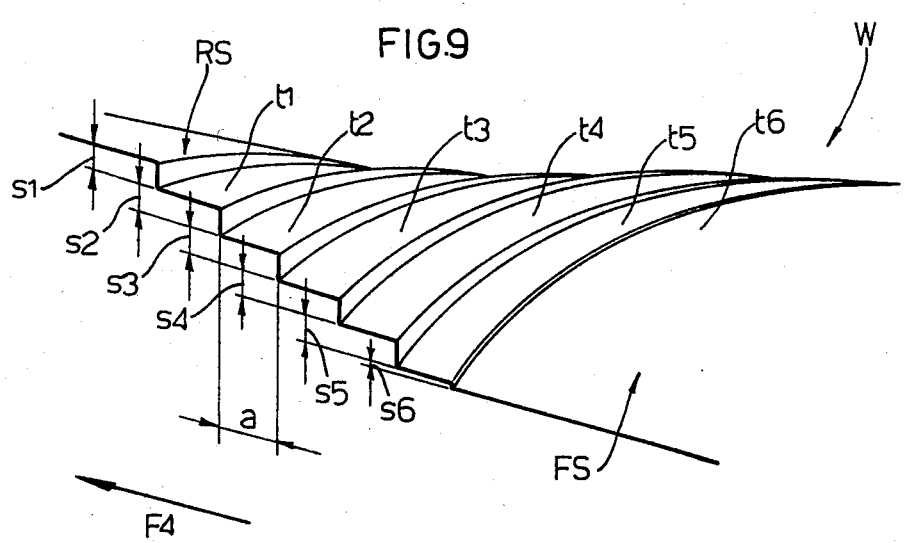
FIG. 9 is a fragmentary perspective view showing the piece being machined, wherein the removed thicknesses have been highly exaggerated.

On exaggerated scale, FIGS. 9 and 10 are perspective and sectional views, respectively, showing how the successive elementary tools operate onto the workpiece W, whose initial raw surface is indicated by RS, the finished surface of which is indicated by FS.

The working zones for the successive elementary tools are indicated by $t_1, t_2, \ldots t_6$.

The chip thicknesses or stock removed by the individual elementary tools are indicated by $s_1, s_2, \ldots s_6$. The thickness $s_1$ depends on the initial machining stock, while $s_2, s_3, \ldots s_6$ are the differences in distance shown as in FIG. 7.

The dimensions q indicate the lengths for the front cutting edges 40 of FIG. 6. These lengths q are not necessarily equal to one another.

Dimension a indicates the pitch, i.e the advancement at each revolution, of each elementary tool.

The value of a is as follows:

$$a \leq P_s/Z; \quad a = V_{av}/N.$$

wherein:

$P_s$ is the pitch for the spiral on which the elementary tools are arranged;

$V_{av}$ is the advancement or feeding speed for the piece in the direction of its axis X;

Z is again the number of tools (6 in this case); and

N is again the r.p.m. for the composite tool.

In order to avoid any discontinuity in machining of the cylindrical surface, the length q for the front cutting edge 40 of each elementary tool should fulfil the relation:

$$q \geq a$$

When machining a copper cylinder or roller, with N=4500 r.p.m. and $V_{av}$ in the range of 75 to 1500 mm/min, it will be:

$$0.0166 < a < 0.33 \text{ mm}$$

A convenient value for a is in the order of 0.2 mm.

As to the chip thicknesses removed by the first four tools (rough-shaping tools) $32_1, 32_2, 32_3$ and $32_4$, the thickness $s_1$ will depend on the machining stock, while the thicknesses $s_2, s_3$ and $s_4$ (corresponding to the projections of FIG. 7) will be preferably equal to one another and, in the case of a copper cylinder or roller, in the order of 0.05 mm. Still in the case of a copper cylinder or roller, the chip thicknesses $s_5$ and $s_6$ removed by the finishing elementary tools $32_5$ and $32_6$ will preferably be in the order of 0.02–0.03 mm. The case is also contemplated where the final pass depth $t_6$ of the last finishing tool $32_6$ is substantially zero ($S_6 \approx 0$). In this case the last two finishing tools $32_5$ and $32_6$ would behave as a single two-step acting tool. This could allow to continue the machining operation even when one of the finishing tools should splinter during operation or work. However, in case of fine finishing of copper cylinders or rollers, a too small depth of final pass would involve the risk of an undesirable upsetting of the surface.

Normally, the tool $32_1$ which is on the major radius (rough-shaper) will be the first to engrave on the surface of piece W.

On the ground of these presuppositions, each actual chip, whatever is the shape of the workpiece, will never exceed the section $a \times s$, where s is time by time equal to $s_1, s_2, \ldots s_6$.

The radial positioning for the front cutting edges 40 (FIG. 6) of the elementary tools has to be carefully carried out, particularly as to the finishing tools $32_5$ and $32_6$, for which the respective cutting edges 40 should be strictly orthogonal as far as possible and incident to the axis of rotation Y for the composite tool.

For the rough-shaping elementary tools $32_1, 32_2, 32_3$ and $32_4$, the positioning of the cutting edges 38, 40 should not necessarily fulfil requirements of extreme accuracy.

Finally, only the finishing tools involve for positioning thereof a high accuracy and therefore a relatively high cost, while for the rough-shaping tools accuracy and accordingly positioning costs are less.

The positioning for the finishing tools shall be still more accurate where the distance differential $s_6$ thereof is substantially zero.

By a machine having the above described features of the invention, by the use of diamond tools, a mirror finishing of cylindrical surfaces can be provided, particularly surfaces of copper cylinders or rollers for offset printing.

What we claim is:

1. A machine tool for machining workpieces by chip removal machining operations according to a ruled quadric surface, said machine being of a type essentially comprising a workpiece holder unit for rotation of a workpiece about an axis of the quadric surface to be obtained, and a rotary composite tool having a series of at least three elementary tools located at angularly spaced apart positions about a rotation axis for the composite tool, each said elementary tool having a respective front cutting edge, said rotation axis for the composite tool being orthogonal to a plane tangent to said quadric surface and said composite tool being movable relative to the workpiece and parallel to said plane, wherein the front cutting edges lie in a plane at right angles to the axis of rotation of the composite tool; the front cutting edges for consecutive machining operations are arranged consecutively on the composite tool on angularly spaced apart radiuses and at decreasing spacings from its axis of rotation and at decreasing spacing from said tangent plane, a farthest front cutting edge from the axis of rotation being also farthest from the tangent plane, and wherein the front cutting edges are of such a length and arrangement that a portion of a circular path for each successive cutting edge, referring to the direction of rotation, partially overlies the path of the immediately preceding front cutting edge, for a gradual machining.

2. A machine tool according to claim 1, said front cutting edges being substantially radial with respect to the rotational axis of the tool.

3. A machine tool according to claim 1 or 2, wherein the front cutting edges lie within an annulus centered on the axis of rotation for the composite tool, and intersected by a longitudinal plane having the axis of rotation for the workpiece lying therein.

4. A machine tool according to claim 3, wherein said longitudinal plane passes through the front cutting edges path and especially through the tools which are nearest to the axis of rotation of the composite tool and to said tangent plane.

5. A machine tool according to claim 4, wherein the elementary tool which is nearest to the axis of the composite tool is a finishing tool and the chordal distance between the finishing tool and an adjacent tool is larger than the length of a chord which is the intersection of said longitudinal plane with the annulus described by the finishing tool.

6. A machine tool according to claim 1, wherein the front cutting edges are arranged according to at least a spiral centered on the axis of rotation of the composite tool.

7. A machine tool according to claim 6, wherein the spiral is an Archimedean spiral.

8. A machine tool according to claim 1 or 6 wherein the front edges are arranged on angularly equispaced radiuses.

9. A machine tool according to claim 1, wherein the composite tool comprises a disc-like supporting body, one front face of which has secured thereto a plurality of elementary tools in the form of small bars, each of said bars provided with one of the front cutting edges and a corresponding side cutting edge.

10. A machine tool according to claim 1, for the machining of cylindrical surfaces, particularly for the finishing of copper cylinders or rollers in offset printing, wherein the composite tool is carried by an operating head movable parallel with the axis of rotation for the workpiece.

11. A machine tool according to claim 10, said operating head being carried by a slide transversely movable relative to the axis of rotation of the workpiece, said slide being carried by a carriage movable parallel with the axis of rotation for the workpiece.

12. A composite tool for a machine tool for machining workpieces by chip removal machining operation according to a ruled quadric surface, said machine being of a type essentially comprising a workpiece holder unit for rotation of the workpiece about an axis of the quadric surface to be obtained, and a support for the composite tool, said composite tool having elementary tools located at angularly spaced apart positions about a rotation axis for the composite tool, each said elementary tool having a respective side cutting edge and a front cutting edge, the rotation axis for the composite tool in the machine being orthogonal to a plane tangent to said quadric surface and the composite tool being movable relative to the workpiece parallel to said plane, at least the finishing cutting edge being parallel to the tangent plane and wherein at least two of said front cutting edges perform consecutive machining operations and are arranged at decreasing spacings from said axis of rotation and at decreasing spacings from said tangent plane, a farthest of said front cutting edges from the axis of rotation being also farthest from the tangent plane, and wherein the front cutting edges are of such a length and arrangement that a portion of a circular path for each successive cutting edge, referring to the direction of rotation, partially overlies the path of the immediately preceding front cutting edge, said tools for consecutive machining operations being located on angularly spaced apart radiuses of said composite tool, so that a device is provided capable of a gradual machining in a complete revolution of the machine tool in a plurality of steps, the last step being a finishing step.

* * * * *